US 6,711,702 B1

(12) United States Patent
Oberhauser

(10) Patent No.: US 6,711,702 B1
(45) Date of Patent: Mar. 23, 2004

(54) METHOD FOR DEALING WITH PERIPHERAL UNITS REPORTED AS DEFECTIVE IN A COMMUNICATIONS SYSTEM

(75) Inventor: Walter Oberhauser, Wolfratshausen (DE)

(73) Assignee: Siemens Aktiengesellschaft, Munich (DE)

(*) Notice: Subject to any disclaimer, the term of this patent is extended or adjusted under 35 U.S.C. 154(b) by 483 days.

(21) Appl. No.: 09/677,548

(22) Filed: Oct. 2, 2000

(30) Foreign Application Priority Data

Sep. 30, 1999 (DE) .......................... 199 47 135

(51) Int. Cl.[7] .............................................. G06F 11/00
(52) U.S. Cl. ............................ 714/47; 714/44; 714/25; 714/5
(58) Field of Search .......................... 714/47, 44, 25, 714/5; 710/8

(56) References Cited

U.S. PATENT DOCUMENTS

| | | | | |
|---|---|---|---|---|
| 4,635,258 A | * | 1/1987 | Salowe | 714/47 |
| 5,896,494 A | * | 4/1999 | Perugini et al. | 714/27 |
| 5,905,857 A | * | 5/1999 | Buzby et al. | 714/38 |
| 6,292,910 B1 | * | 9/2001 | Cummins | 714/43 |
| 6,453,430 B1 | * | 9/2002 | Singh et al. | 714/47 |

FOREIGN PATENT DOCUMENTS

| | | |
|---|---|---|
| DE | 37 31 337 A1 | 3/1989 |
| GB | 2 120 042 A | 11/1983 |

* cited by examiner

Primary Examiner—Robert Beausoliel
Assistant Examiner—Anne L. Damiano
(74) Attorney, Agent, or Firm—Laurence A. Greenberg; Werner H. Stemer; Ralph E. Locher

(57) ABSTRACT

The method defines steps and sequences for dealing with peripheral units reported as defective in a communications system. A repetition counter for counting a number of start-up attempts is provided for a restarting procedure. During a locked phase, the peripheral unit that is affected is temporarily taken out of service. After that, a monitoring phase with a temporary start-up is initiated during which tests for faults are carried out. If the unit is determined to be free from faults, a final start-up takes place following the monitoring phase. In the case of a fault during the monitoring phase, the count of the repetition counter is compared with a threshold value. A final taking-out-of-service takes place if the count of the repetition counter exceeds the threshold value. Otherwise, the repetition counter is incremented and another transition into the locked phase takes place. The duration of the locked phase is dependent on the count of the repetition counter.

9 Claims, 2 Drawing Sheets

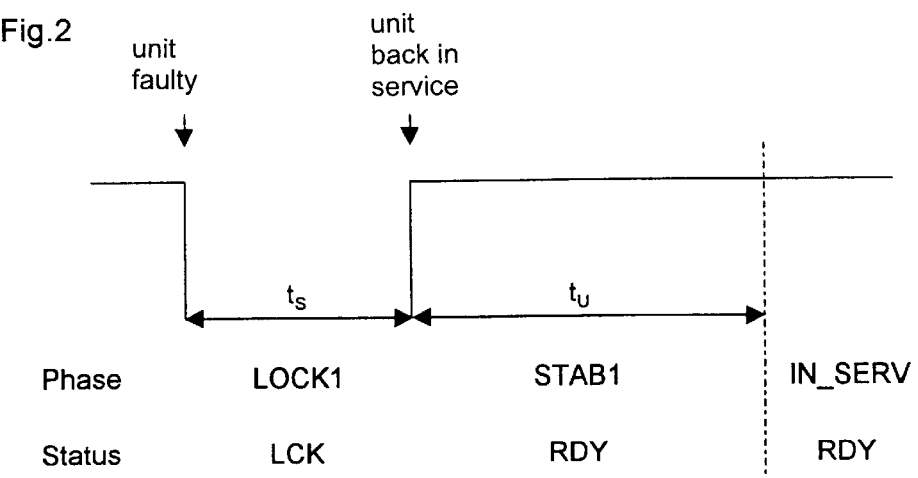
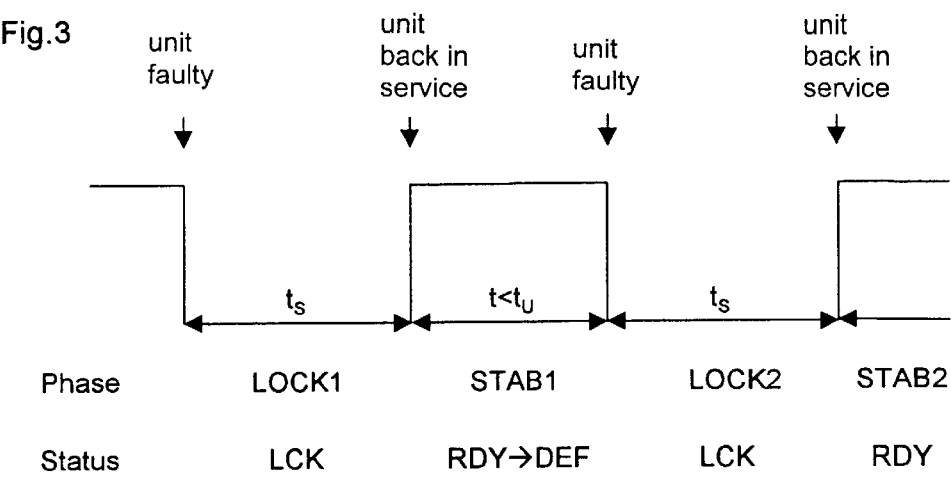

METHOD FOR DEALING WITH PERIPHERAL UNITS REPORTED AS DEFECTIVE IN A COMMUNICATIONS SYSTEM

BACKGROUND OF THE INVENTION

FIELD OF THE INVENTION

The invention lies in the field of communications technology. More specifically, the invention relates to a method for dealing with peripheral units reported defective in a communications system.

In communications systems, methods for automatic restarting are used for putting defective assemblies, circuits and terminals back into operation as quickly as possible by means of a start-up attempt in order to minimize any downtimes. Although it is not possible to eliminate severe hardware defects by such methods, they can be used for eliminating faults which are rectified after a restart of the unit affected. Such faults can be caused, for example, by maintenance and servicing work on the communications system. In the methods previously proposed, the peripheral units affected by a fault such as assemblies, circuits and terminals are locked for a certain time and then taken into service again. Following the restart, the units affected are subjected to intensive monitoring for a certain period of time. They are finally taken into service if no further fault occurs during this monitoring period. Otherwise; the peripheral unit is finally locked out. The locked period has the purpose of filtering out only the first fault in each case when similar faults occur in large numbers. The monitoring time ensures sufficient system stability after the restart. It is especially in the peripherals of switching banks that assemblies, line units and terminals are frequently locked out too early by the dependability system by the known methods for restarting.

SUMMARY OF THE INVENTION

The object of the invention is to provide a method of dealing with peripherals in a communications system that have been reported as defective which overcomes the above-noted deficiencies and disadvantages of the prior art devices and methods of this kind, and which allows for the fastest possible restarting of peripheral units which are temporarily defective in communications systems.

With the above and other objects in view there is provided, in accordance with the invention, a method of dealing with peripheral units reported as defective in a communications system, which comprises:

providing a repetition counter for counting a number of start-up attempts in a restarting procedure;

initiating a locked phase for temporarily taking a given peripheral unit out of service;

initiating a monitoring phase during which the peripheral is temporarily started up and tests for faults are performed;

upon determining that the peripheral is free from faults, finally placing the peripheral in service following the monitoring phase;

upon detecting a fault during the monitoring phase, comparing a count of the repetition counter with a given threshold value; and if the count of the repetition counter exceeds the threshold value, finally taking the peripheral out of service;

if the count of the repetition counter does not exceed the threshold value, incrementing the repetition counter and transitioning the peripheral into the locked phase;

whereby a duration of the locked phase is dependent on the count of the repetition counter.

The novel method provides for considerable relief of engineering and maintenance due to the fact that the necessity of taking defective devices into service manually is reduced. The downtimes are also very short compared with manual startup attempts by a service center. One side-effect of the increased availability are the reduced numbers of subscriber complaints, for example because of failed terminals or line connections. Restarting by means of the method according to the invention is basically possible for all peripheral line units, assemblies, circuits and terminals. Furthermore, continuously defective peripheral units are detected by the fact that they are not starting up after the restart process has ended.

In accordance with an added feature of the invention, the repetition counter is initialized in the course of starting the restarting procedure.

In accordance with an additional feature of the invention, a plurality of peripheral units are allocated the following hierarchy levels:

a) line unit;

b) assembly;

c) circuit;

d) terminal.

For the duration of the locked phases within the hierarchy levels of line unit, assembly, circuit and terminal, separate hierarchy-level-specific time series are preferably used in each case. In some cases, however, it may be appropriate to normalize the duration of the locked phases and of the monitoring phases centrally for all peripheral units to be taken into service. This provides the advantage that no adaptation to special fault situations of individual devices or groups of devices is necessary since, within the maximum number of possible start-up attempts, a failed start-up attempt is followed by the next one.

In accordance with an advantageous embodiment of the method according to the invention, peripheral units are also taken into consideration which are locked when a fault statistics counter associated with a fault analysis device overflows. The fault statistics counter should then be reset after each final start-up. Coupling with fault statistics counters makes it possible to stem floods of reports in the event of faults in communications systems.

The restarting procedure can also be started on initiation of a routine test control which carries out background tests for regular checks of hardware functions, after negative test results. In addition, peripheral units can be taken into consideration which are locked directly by a central device administration.

In accordance with a concomitant feature of the invention, a check is made before the restarting procedure is started as to whether the peripheral units to be taken back into service are qualified for automatic restarting in any case. Thus, special assemblies can be excluded from the treatment by the method according to the invention inasmuch as this is necessary for management reasons. Furthermore, the end of the locked phase can be followed by a status check of the units to be taken back into service. If this check results in the status "locked", the monitoring phase is initiated next. Otherwise, the peripheral units are finally taken out of service. Correspondingly, the end of the monitoring phase can also be followed by a status check. The peripheral units are then only taken into service again if they are in the "ready" state. Otherwise, they remain in the previous state and are deleted from an administration list.

Other features which are considered as characteristic for the invention are set forth in the appended claims.

Although the invention is illustrated and described herein as embodied in a method for dealing with peripheral units reported as defective in a communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a state/time diagram for a peripheral unit to be taken back into service, illustrating a successful restart operation; and FIG. 3 is a state/time diagram illustrating a failed first reactivation attempt.

DESCRIPTION OF THE PREFERRED EMBODIMENTS

Figure 1:
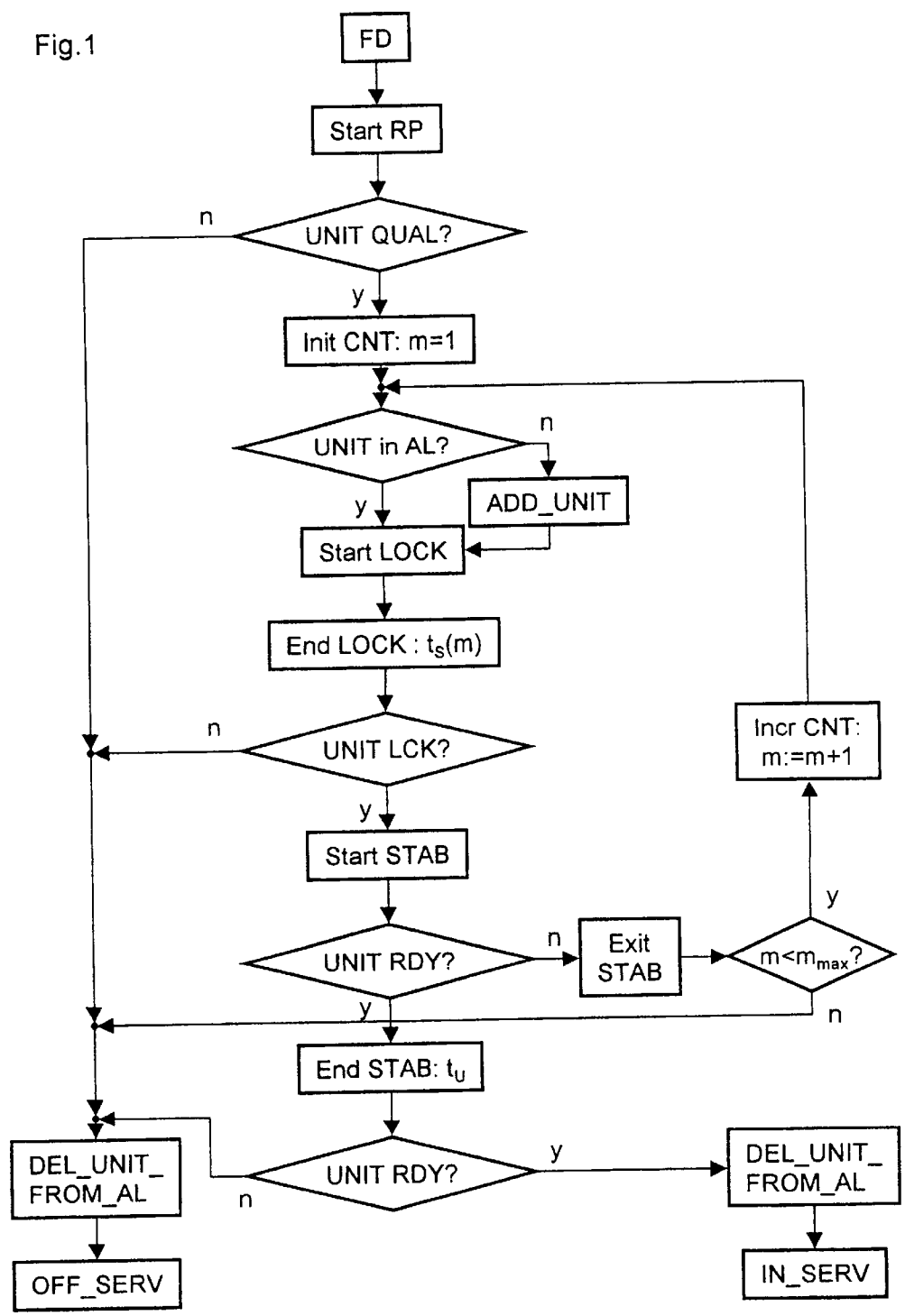
FIG. 1 is a flowchart detailing a method according to the invention with some advantageous embodiments.

Referring now to the figures of the drawing in detail and first, particularly, to FIG. 1 thereof, the starting point of the flowchart shown in FIG. 1 is a fault detection FD, for example by means of a routine check control. A peripheral unit affected is then dealt with by a restarting procedure RP. After the restarting procedure RP has been started, a preliminary qualification UNIT QUAL test takes place to establish whether the peripheral unit to be taken back into service is qualified for an automatic restart. If the result is negative, a final decommissioning OFF_SERV takes place. Otherwise, a repetition counter CNT is initialized for counting the number of restart attempts. The value of the repetition counter CNT is set in this case to the value 1.

After the counter has been started, a check is made as to whether the unit is entered in an administration list AL for listing peripheral units which are to be taken into service in parallel. This provides the advantage that the number of peripheral units to be taken back into service simultaneously can be counted. This makes it possible to estimate the effects on the system dynamics. If necessary, this leads to the number of peripheral units to be taken back into service in parallel being limited.

If the unit is not yet in the administration list, the list is supplemented by ADD_UNIT. After that, a locked phase LOCK is initiated, the duration $t_s$ of which depends on the value m of the repetition counter CNT. Locking means the temporary decommissioning of the peripheral unit. After the locked phase LOCK has ended, the status of the peripheral unit to be taken back into service is checked. If the unit is in a locked state LCK, a monitoring phase or stabilization phase STAB is initiated, the duration $t_u$ of which is independent of the value m of the repetition counter CNT. If the status check after the end of the locked phase LOCK shows that the status of the peripheral unit has changed into ready or if the unit has been dismantled in the meantime, the unit is deleted DEL_UNIT_FROM_AL from the administration list AL.

During the monitoring phase STAB, a permanent check is made as to whether the peripheral unit to be taken back into service is in a ready state RDY. If this is not so, the monitoring phase STAB is aborted. After that, a check must be made as to whether a threshold value $m_{max}$ for the maximum number of restart attempts has already been exceeded. If this is so, the peripheral unit is finally taken out of service. Otherwise, the value m of the repetition counter CNT is incremented and a new locked phase LOCK is started.

If, in contrast, no further fault occurs during the monitoring phase STAB and the status of the peripheral unit is also ready RDY after the monitoring phase has ended, the final start-up IN_SERV takes place. If, however, the status inquiry after the end of the monitoring phase STAB shows that the peripheral unit is not ready, then it will be deleted from the administration list AL.

The threshold value for start-up attempts and the duration of the locked and monitoring phases can be adapted during the restarting procedure. By setting up locked phases which are initially short and become longer and longer, the number of start-up attempts can be optimized in accordance with the failure probability of a line unit, an assembly, a switching element, or a terminal. As a rule, such grading of the start-up attempts ensures that peripheral units to be taken back into service can also be automatically taken into service again after more extensive maintenance activity. Permanently defective units, however, are finally taken out of service in accordance with the threshold value for the maximum number of permissible restart attempts.

For the first restart attempts, relatively short locked phases should be provided in order to avoid, on the one hand, unnecessarily long downtimes for the users and, on the other hand, to suppress redundant alarm messages. This can be achieved, for example, by the duration of the first three locked phases in each case being shorter than a validation time for the triggering of an alarm. In general, the duration of the locked phases can be between 1 minute and 60 minutes and the duration of the monitoring phases can be between 10minutes and 30 minutes. In the case of alarm messages, the validation times are frequently about 10 minutes. Furthermore, the threshold value for the maximum number of possible restart attempts should be limited to 8 ($m_{max}$=8). The implementation of a restart procedure can be simplified if the duration of the monitoring phases is independent of the number of restart attempts.

With reference to FIG. 2, there is illustrated the time sequence in the case of a successful restart after only one start-up attempt. The starting point is a peripheral unit which has been reported as being defective whereupon the restarting procedure RP is started. Firstly, the locked phase LOCK1 is initiated. During the locked phase LOCK1, the unit to be taken back into service is in the locked state LCK. This condition is maintained for the entire duration of the locked phase LOCK1 so that this is followed by the transition to the monitoring phase STAB1.

During the monitoring phase STAB1, the peripheral unit is temporarily taken into service again. In the present case, the peripheral unit retains the ready state RDY during the entire monitoring phase STAB1 so that a final restart IN—SERV can take place after the monitoring phase STAB1 has elapsed.

With reference to FIG. 3, there is shown the time sequence in the case of a failed first reactivation attempt. Here, too, the restarting procedure RP is started due to a peripheral unit having been detected as defective. After the end of a first locked phase LOCK1, the unit is temporarily taken back into service during the monitoring phase STAB1. During the monitoring phase, however, the unit to be taken back into service changes its state from ready RDY into defective DEF whereupon the monitoring phase STAB1 is aborted and a next locked phase LOCK2 is initiated immediately thereafter. After this second locked phase LOCK2 has elapsed, the peripheral unit is temporarily taken into service again during a second monitoring phase STAB2. If no further fault occurs after the end of this monitoring phase STAB2, the peripheral unit can be finally taken back into service.

I claim:

1. A method of dealing with a plurality of peripheral units reported as defective in a communications system, which comprises: allocating the plurality of peripheral units to the following hierarchy levels: a) line unit; b) assembly; c) circuit; and d) terminal;

provided a repetition counter for counting a number of startup attempts in a restarting procedure;

initiating a locked phase for temporarily taking a given one of the plurality of peripheral units out of service;

initiating a monitoring phase during which the given one of the plurality of peripheral units is temporarily started up and tests for faults are performed;

upon determining that the given one of the plurality of peripheral units is free from faults, finally placing the given one of the plurality of peripheral units in service following the monitoring phase;

upon detecting a fault during the monitoring phase, comparing a count of the repetition counter with a given threshold value; and if the count of the repetition counter exceeds the threshold value, finally taking the given one of the plurality of peripheral units out of service;

if the count of the repetition counter does not exceed the threshold value, incrementing the repetition counter and transitioning the given one of the plurality of peripheral units into the locked phase;

whereby a duration of the locked phase is dependent on the count of the repetition counter.

2. The method according to claim 1, which comprises initializing the repetition counter in the course of starting the restarting procedure.

3. The method according to claim 1, which comprises defining hierarchy-level-specific time series for a duration of the locked phases.

4. The method according to claim 1, which comprises setting the duration of the monitoring phases in a hierarchy-level-specific manner.

5. The method according to claim 1, which comprises setting a duration of each of the first three locked phases shorter than a validation time for triggering an alarm.

6. The method according to claim 1, which comprises starting the restarting procedure on initiation by a routine test control conducting regular background checks of hardware functions, upon determining negative test results.

7. The method according to claim 1, which comprises starting the restarting procedure after direct locking by a central device administration.

8. The method according to claim 1, which comprises, prior to taking the given one of the plurality of peripheral units back into service, checking the given one of the plurality of peripheral units as to whether the given one of the plurality of peripheral units is qualified for a restart, and starting the restarting procedure only upon a positive test result.

9. A method of dealing with peripheral units reported as defective in a communications system, which comprises:

providing a repetition counter for counting a number of startup attempts in a restarting procedure;

initiating a locked phase for temporarily taking a given peripheral unit out of service;

initiating a monitoring phase during which the peripheral is temporarily started up and tests for faults are performed;

upon determining that the peripheral is free from faults, finally placing the peripheral in service following the monitoring phase;

upon detecting a fault during the monitoring phase, comparing a count of the repetition counter with a given threshold value;

if the count of the repetition counter exceeds the threshold value, finally taking the peripheral out of service;

if the count of the repetition counter does not exceed the threshold value, incrementing the repetition counter and transitioning the peripheral into the locked phase, a duration of the locked phase being dependent on the count of the repetition counter; and monitoring the peripheral units with a fault detection device interacting with a fault statistics counter of a fault analysis device, wherein the fault statistics counter is reset with each final placing in service, and the restarting procedure is started when the fault statistics counter overflows.

* * * * *